Jan. 28, 1958
H. FRIEDMAN
2,821,633
SCINTILLATOR
Filed June 30, 1955
2 Sheets-Sheet 1
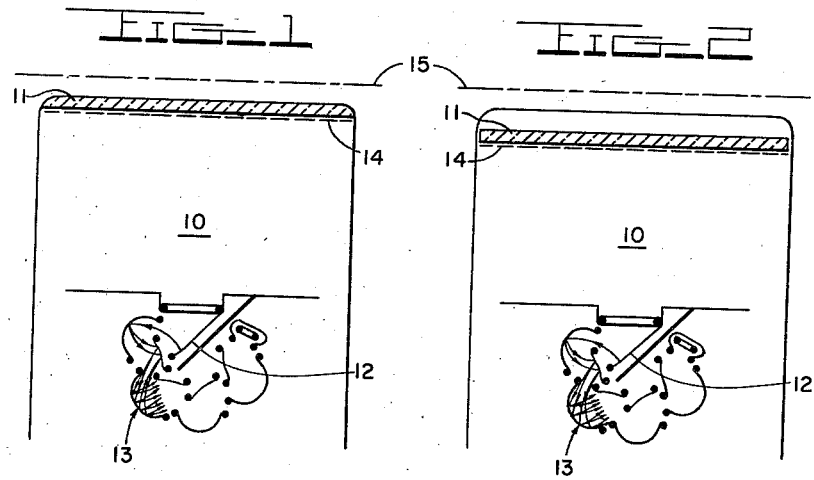
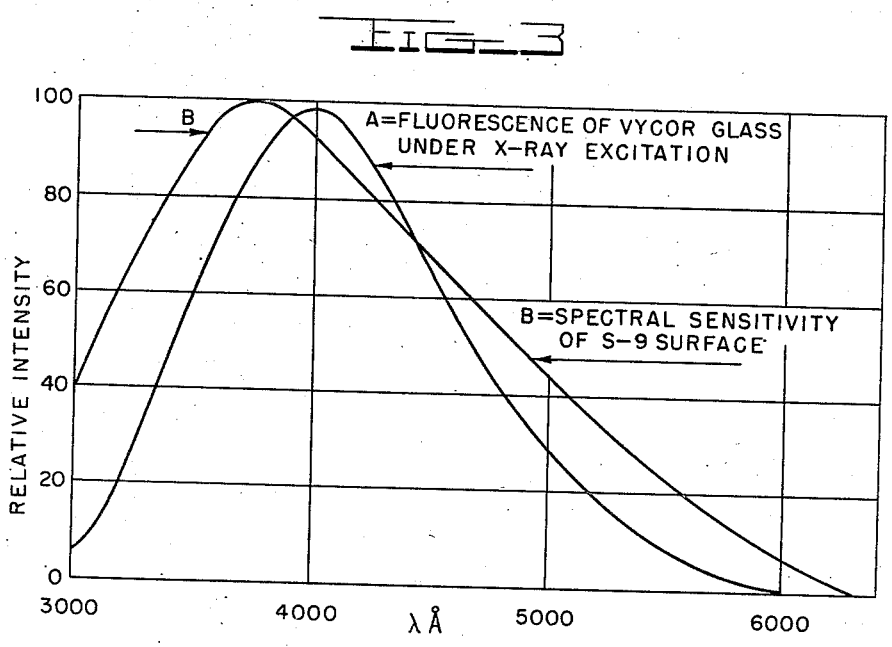
INVENTOR
HERBERT FRIEDMAN
BY
ATTORNEYS Jan. 28, 1958

H. FRIEDMAN 2,821,633

SCINTILLATOR

Filed June 30, 1955

INVENTOR
HERBERT FRIEDMAN

BY

ATTORNEYS

United States Patent Office 2,821,633
Patented Jan. 28, 1958

2,821,633

SCINTILLATOR

Herbert Friedman, Arlington, Va.

Application June 30, 1955, Serial No. 519,299

9 Claims. (Cl. 250—71)

(Granted under Title 35, U. S. Code (1952), sec. 266)

The invention described herein may be manufactured and used by or for the Government of the United States of America for governmental purposes without the payment of any royalties thereon or therefor.

This invention relates to a scintillation counter comprising a phosphor photomultiplier tube in combination with a scintillant glass detector element for detecting gamma and particle radiation more especially from nuclear explosions.

Scintillation counting technique is at present being applied to the design of portable radiation detectors for radiac uses. In the simplest arrangement a measurement is made of only the integrated pulse current produced by a photomultiplier in response to luminescence of a phosphor subjected to gamma and particle radiation. Various phosphor crystals have been used in combination with a photomultiplier tube to detect X-rays, beta rays, gamma rays, alpha particles and other related particles. The crystals used such as anthracene, naphthalene, thallium activated KI or NaI and calcium tungstates have to be grown and require considerable skill, attention, and time in their preparation.

The scintillant element of this invention for radiation detection affords many advantages in the production and assembly of these devices. Uniform elements can be produced in quantity, and assembled directly as the tube window with present techniques for production of conventional photodetectors of non-scintillant glass components.

For the application of a device to measure roentgen dose associated with fields of penetrating radiation such as gamma radiation resulting from a nuclear explosion or X-rays, it is desirable that response of scintillator and photomultiplier tube combine to produce an indication paralleling that of an ionization chamber over the gamma energy range of 100 k. e. v. to several million volts. The use of silica glasses such as Vycor glass from which almost all components but the silica have been leached, because of the low atomic number components, fulfills the spectral sensitivity requirement and constitutes the main feature of this invention. The spectral intensity distribution of secondary radiation from Vycor glass can be closely matched by available photosurfaces applied in photomultiplier tubes. The latter factor, coupled with its close approximation to the effective atomic number of air, renders it one of the preferable glasses for use in scintillation counters.

The roentgen unit is based on ionization and is that quantity of X- or gamma radiation of which the associated corpuscular emission per cc. of air, produces ions carrying one electrostatic unit of electricity of either sign. One roentgen produces $1.62 \times 10^{12}$ ion pairs per gram of air. The roentgen equivalent of gamma rays is that amount of radiation which produces the same amount of ionization in one cc. of air as one roentgen of X-rays. The number of roentgens measured in air at various distances from the target is known as the dose measured in air. When a patient is being treated the dose measured at the skin, the skin dose, must be known as well as the dose at various depth levels in the body, the depth dose. Roentgen rays ionize indirectly causing physical changes by ionization which forms pairs of positive and negative ions by removing electrons from some atoms and attaching them to others, the excited atoms producing chemical changes.

Biological tissue has an effective average atomic number approximating that of air therefore the ionization of radiation in the body tissue is approximately the same as that in air and a measure of the radiation in air will be effectively the same as that in the body tissue. Radiation doses may be broadly grouped according to exposure levels of 0–200, 200–400, and 400–600 roentgens; 0–200 causing injury and possible disability; 200–400 injury and possible death; 400–600 fatal to the majority.

A preferred embodiment of the present invention makes use of a glass scintillator which has effectively the same average atomic number of air and the biological tissues of the body; therefore, the ionization that takes place in the glass will effectively be the same as that which would take place in an air chamber or in the biological tissues. The glass is a scintillator and functions in the scintillation counter hereinafter described.

It is an object of this invention to provide a simple and inexpensive device for detecting nuclear particles or quanta.

It is a further object to provide a scintillant glass element in combination with and as a part of a photomultiplier tube for detection of gamma and particle radiation.

A final object of the present invention is to combine a glass scintillator and photomultiplier to produce an indication of the presence of gamma and particle radiation more especially from nuclear explosions, by counting and analysing the output pulses.

Other and more specific objects of this invention will become apparent upon a careful consideration of the following detailed description when taken together with the accompanying drawings, in which:

Fig. 1 illustrates a scintillant glass window in a photomultiplier tube;

Fig. 2 illustrates a photomultiplier tube modified to include a scintillant glass element secured within the tube envelope;

Fig. 3 illustrates the spectral distribution of scintillations from Vycor glass relative to the sensitivity curve of the S-9 surface of a 5819 photomultiplier tube.

Figure 4:
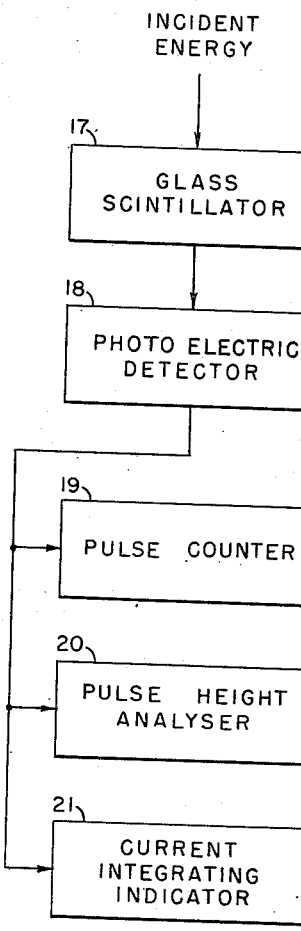
Fig. 4 illustrates in block form the components of the detector in combination with some instruments which may be used therewith.

A scintillation counter is a photon-conversion device in which incident energy of the penetrating radiation is absorbed by a scintillator to produce secondary photons which are in turn detected by a photo-sensitive device.

The radiation detector of the present invention in the preferred embdiment uses a silica glass such as Vycor glass from which almost all components but the silica have been leached, to provide a glass scintillator 11 which may have an effective average atomic number approximating that of air. Since the roentgen dose is defined in terms of air ionization, it is an important feature to have a scintillator with an atomic number which approximates that of air. Gamma rays incident on the scintillator penetrate the scintillant glass and transfer energy according to the Compton effect by removing electrons from the atoms in the glass. These electrons give up energy by impacts with the atoms of the glass, causing a conversion of gamma ray energy to blue light. This secondary light then strikes the photosensitive coating 14 on the surface of the scintillator glass and for each light quantum that strikes the coating, the coating produces on the average a fraction of a photoelectron which comes off within the inside of the tube and is attracted to the photo-cathode 12. The photo-electrons strikes the first dynode causing an emission of electrons which are attracted to the second dynode structure and so on causing the photomultiplier tube 10 to operate in its usual manner.

As shown in Fig. 1 the glass scintillator 11 forms the window of the tube 10 and has the usual photosensitive coating 14 on the inner surface of the tube.

The modification shown in Fig. 2 comprises a photomultiplier tube structure including a glass scintillator 11 mounted inwardly thereof, between the window and the photo-cathode. In this modification the glass scintillator has a photoemissive coating 14 on the surface toward the photo-cathode. This coating 14 replaces the photoemissive coating which is normally coated on the window of a standard photomultiplier tube and functions in the same manner as explained in the operation of the glass scintillator of Fig. 1. The glass scintillator element does not deteriorate the vacuum in the tube and the function of the scintillator as a radiation detector is as effective as the scintillator is when the scintillator forms the window portion of the tube. A large factor in geometrical efficiency, and reduction of optical losses comes from mounting the scintillator within the tube rather than externally, as has been the usual practice. However, if desired, the glass scintillator element may be employed in the latter convential manner.

In Fig. 3 the spectral distributon of scintillations from Vycor glass relative to the sensitivity curve of the S–9 surface of a 5819 photomultiplier tube is shown. Vycor glass is used for illustrative purposes and it is obvious that other glasses such as borosilicates and leaded glass with the usual impurities can be used as the scintillant.

Fig. 4 illustrates in block form the invention in combination with an output instrument which may be a pulse counter 19, pulse height analyser 20 or a current integrating indicator 21. Light incident on the glass scintillator 17 produces blue light which is detected by the photoelectric detector 18. The current pulses produced by the photoelectric detector are connected with the desired instrument. The number of pulses shown by a pulse detector depends on the quantity of radiation and the pulse height depends on the amplitude or energy of the incident quanta. Quanta with the larger amounts of energy will produce stronger light pulses which in turn will produce more photoelectrons and more current flow from the multiplier tube which will produce higher amplitudes than the quanta with lesser energy.

Most applications of the invention will require shielding of the detector from visible light, which would otherwise traverse the glass scintillator and directly activate the photo-cathode, by a member 15 essentially transparent to the penetrating radiation and opaque in the spectrum range to which the cathode is photoelectrically sensitive.

Obviously many modifications and variations of the present invention are possible in the light of the above teachings. It is therefore to be understood, that within the scope of the appended claims, the invention may be practiced otherwise than as specifically described.

What is claimed is:

1. A radiation detector comprising a scintillant glass element operative under penetrating radiation to scintillate substantially in the visible spectrum region and electrically responsive photosensitive means positioned to receive the secondary radiation.

2. A radiation detector comprising a scintillant glass element operative under penetrating radiation to scintillate substantially in the visible spectrum region, electrically responsive photosensitive means positioned to receive the secondary radiation and pulse responsive circuit means fed by the photosensitive means.

3. A radiation detector as defined in claim 3, wherein the scintillant is glass in which almost all components but the silica have been leached.

4. A radiation detector as defined in claim 3, wherein the scintillant is a glass having an effective average atomic number of the same order as air.

5. A radiation detector comprising a scintillant glass element operative under penetrating radiation to generate secondary radiation, photoelectrically responsive cathode means positioned to receive the secondary radiation from said glass scintillator element, and electron multiplier means positioned to receive emission from the cathode means.

6. A radiation detector comprising a scintillant glass element operative under penetrating radiation to generate secondary radiation, photoelectrically responsive means positioned to receive the secondary radiation from said glass scintillator element, electron multiplier means positioned to receive emission from the cathode means and electrically pulse responsive means fed by said electron multiplier.

7. A radiation detector as claimed in claim 6, wherein said scintillant element forms the window of an envelope for said photoelectrically responsive means.

8. A radiation detector as claimed in claim 6, wherein said scintillant element is positioned within the envelope for said photoelectrically responsive means.

9. A radiation detector as claimed in claim 8, wherein said scintillant element is positioned between the window of said envelope and the photoelectrically responsive means.

References Cited in the file of this patent

UNITED STATES PATENTS

| 2,315,328 | Hood et al. | Mar. 30, 1943 |
| 2,525,832 | Sheldon | Oct. 17, 1950 |
| 2,686,266 | Pringle et al. | Aug. 10, 1954 |
| 2,689,188 | Hushley | Sept. 14, 1954 |

OTHER REFERENCES

"A Coincidence Scintillation Counter," Morton et al., Nucleonics, February 1949, pp. 25–29.

"The Scintillation Counter," Coltman, Proceedings of I. R. E., June 1949, pp. 671–682.

UNITED STATES PATENT OFFICE

CERTIFICATE OF CORRECTION

Patent No. 2,821,633 January 28, 1958

Herbert Friedman

It is hereby certified that error appears in the printed specification of the above numbered patent requiring correction and that the said Letters Patent should read as corrected below.

Column 4, lines 17 and 20, for the claim reference numeral "3", each occurrence, read -- 2 --; lines 38 and 41, for the claim reference numeral "6", each occurrence, read -- 5 --.

Signed and sealed this 5th day of August 1958.

(SEAL)
Attest:

KARL H. AXLINE
Attesting Officer

ROBERT C. WATSON
Commissioner of Patents